US006330674B1

(12) United States Patent
Angelo et al.

(10) Patent No.: US 6,330,674 B1
(45) Date of Patent: Dec. 11, 2001

(54) USE OF BIOMETRICS AS A METHODOLOGY FOR DEFINING COMPONENTS FOR ECC ENCRYPTION

(75) Inventors: Michael F. Angelo, Houston; Drue A. Reeves, Magnolia; Manny Novoa, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/163,758

(22) Filed: Sep. 30, 1998

(51) Int. Cl.[7] .................................................. G06F 11/30
(52) U.S. Cl. ............................................. 713/186; 713/200
(58) Field of Search ..................................... 713/186, 200

(56) References Cited

U.S. PATENT DOCUMENTS

| | | |
|---|---|---|
| 5,272,755 | 12/1993 | Miyaji et al. . |
| 5,351,297 | 9/1994 | Miyaji et al. . |
| 5,526,428 | 6/1996 | Arnold . |
| 5,586,186 | 12/1996 | Yuval et al. . |
| 5,647,017 * | 7/1997 | Smithies et al. ............... 382/119 |
| 5,825,871 * | 10/1998 | Mark ............................... 379/355 |
| 6,064,751 * | 5/2000 | Smithies et al. ............... 382/115 |

* cited by examiner

Primary Examiner—Thomas R. Peeso
(74) Attorney, Agent, or Firm—Conley, Rose & Tayon, P.C.

(57) ABSTRACT

A method for defining the elliptic curve for purposes of elliptic curve encryption using biometrics such as a fingerprint to define the elliptic curve equation's coefficients.

19 Claims, 6 Drawing Sheets

USE OF BIOMETRICS AS A METHODOLOGY FOR DEFINING COMPONENTS FOR ECC ENCRYPTION

BACKGROUND AND SUMMARY OF THE INVENTION

This application relates to encryption, in particular, to elliptic curve encryption and public key encryption.

Background: Certificate Authorities

One of the problems of electronic communication is the difficulty in ensuring the integrity of a message, i.e., that the message has not been tampered with and that it originated with the presumed transmitter. To solve this problem, authentication codes or certificate authorities have been developed to provide authentication of messages.

Background: Public Key Encryption

Public key encryption is a method by which two people may communicate secretly over insecure channels without having agreed in advance on a key for encrypting and decrypting their messages. The idea in public key encryption is to use a "phone book" of encryption keys. This "phone book" makes everyone's encryption key public knowledge. Each person also has a decryption key which is known only to that person. Thus, the encryption and decryption keys are separate keys. To transmit a message, a sender has only to look up the receiver's encryption key in the "phone book" and use it to encrypt their message and then transmit the encrypted message. The receiver then uses his secret decryption key to decrypt the message and read it. For this system to work it must have the property that using the secret key to decrypt the public key encrypted message must yield the uncrypted message for every possible message. This is a fundamental cryptographic property. Furthermore, each pair of secret and public keys must be distinct and deriving the secret key from knowledge of the public key must be as hard as reading the encrypted message. These two conditions provide the security of the system. Finally, to make the system feasible to use, both the secret key and the public key must be easy to compute.

RSA Public Key Cryptosystem

The most popular public-key algorithm over the past twenty years has been RSA. The security of RSA comes from the difficulty of factoring large numbers. The public and private keys are functions of a pair of large prime numbers. These numbers may be 100 or 200 digits or even larger. Recovering the message from the public key and the encrypted message is thought to be equivalent to factoring the product of the two prime numbers.

Recently, however, with the advent of faster computers, RSA has become susceptible to brute force attacks. A brute force attack on an encryption system such as RSA means that every possible combination is tried until the correct solution to the problem is achieved. Therefore, new systems are needed to maintain the security of private information. One new method for encryption to solve this problem is called elliptic curve encryption.

Elliptic Curve Encryption

An elliptic curve is a set of solutions to an equation of the form $y^2+a_1xy+a_3y=x^3+a_2x^2+a_4x+a_6$. An example of an elliptic curve is shown in FIG. 3. It has been discovered that elliptic curves over finite fields (some examples of fields include real numbers, complex numbers, fractions, and integers) can be used to implement key passing schemes. Using elliptic curves to implement these schemes results in equivalent security as existing public key schemes, but with shorter key lengths. Short key lengths means that smaller bandwidths and memory are required for implementation of the scheme. This can be crucial for some applications such as smart card systems, where both memory and processing power is limited.

One of the major drawbacks with ECC is the definition of the ellipse. Currently, this is accomplished using pure mathematical calculations which is costly in terms of time and computer power. Furthermore, the ellipse must be protected, that is the ellipse must be calculated and then stored in a secure (secret) location.

Background: Biometrics

Biometrics can be defined as the use of unique physiological or behavioral characteristics for identification purposes. Biometrics represents one of the most secure and reliable ways of verifying the identity of a particular individual.

Physiological characteristics include handwritten signatures, fingerprints, the filaments of the eye, or the spatial features of a face. Of the various physiological characteristics that can be measured, the fingerprint is recognized as one of the most reliable, unique, undeniable, and unchanging characteristic for identifying persons.

The advantages of biometrics as a security device have caused an increasing demand for use of fingerprints and other physiological features for identification and access purposes. The use of a fingerprint as a means of identifying an individual requires that a reference fingerprint (or "template") first be obtained. The template must be taken of an identified individual to ensure that an identification made years later is accurate. The Federal Bureau of Investigation (FBI) has created a standard for the digitization of the template in order for automatic electronic comparisons of fingerprints to take place. This standard uses an approach known as wavelet transform/scaler quantization (WSQ). WSQ allows fingerprint information to be encoded for later recognition in a compact manner (e.g., with around 1 megabyte of computer storage space per print).

Elliptic Curve Encryption Using Biometrics to Define Components

The present application describes a method for defining the elliptic curve used in elliptic curve encryption. The elliptic curve is defined by a fingerprint or other biometric such as the curvature of the iris. Doing so allows for the creation of a totally random ellipse-like shape which is predefined in space and guaranteed to be unique for each individual. The security advantage of this method is that the ellipse and/or curve are different for each user. This is accomplished faster, and easier than with the current method of pure mathematical calculations whose time varies depending on a multitude of parameters varying from five minutes to an infinite amount of time. This is an improvement over the current method of implementing elliptic curve encryption because the elliptic curve can be generated much faster, the elliptic curve is guaranteed to be unique, and the elliptic curve is less likely to be guessed. These improvements create a much stronger solution to the problem of defining the elliptic curve than do the current methods.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Elliptic Curve Encryption Components Defined by a Fingerprint

In the presently preferred embodiment, the ellipse for elliptic curve encryption (ECC) is defined by a fingerprint. An image of the fingerprint is captured, e.g., with a CCD, solid state camera, or touch sensor. The image is then processed using wavelet transform/scaler quantization (WSQ) or another standard parameter extraction method. The information then consists of a set of points which define the fingerprint. However, a subset of these points also define the elliptic curve for purposes of ECC. Using the points generated by WSQ, perform a curve fitting routine to determine the coefficients for each term of an elliptic curve equation where the generalized form of the equation of an elliptic curve is $y^2+a_1xy+a_3y=x^3+a_2x^2+a_4x+a_6$. The curve so determined is then used for encryption in a public key system.

Because each individual's fingerprint is unique, the elliptic curve generated from the fingerprint is also guaranteed to be unique. Furthermore, under normal ECC the elliptic curve must be protected, that is, the elliptic curve must be calculated and then stored in a secure (i.e. secret) location. However, using the described method, the only security issue is the exposure of the fingerprint. This exposure can be mitigated by protecting the XY origin or rotation for the elliptic curve. Furthermore, the exposure is also reduced by the need for a person trying to compromise the system to have physical access to a copy of the fingerprint as well as to the XY origin.

The large prime number modulus and the curve for ECC are picked a priori.

Alternate Embodiment: Ellipse Defined by a Fingerprint

Figure 1:
FIG. 1 depicts a fingerprint.
Figure 3:
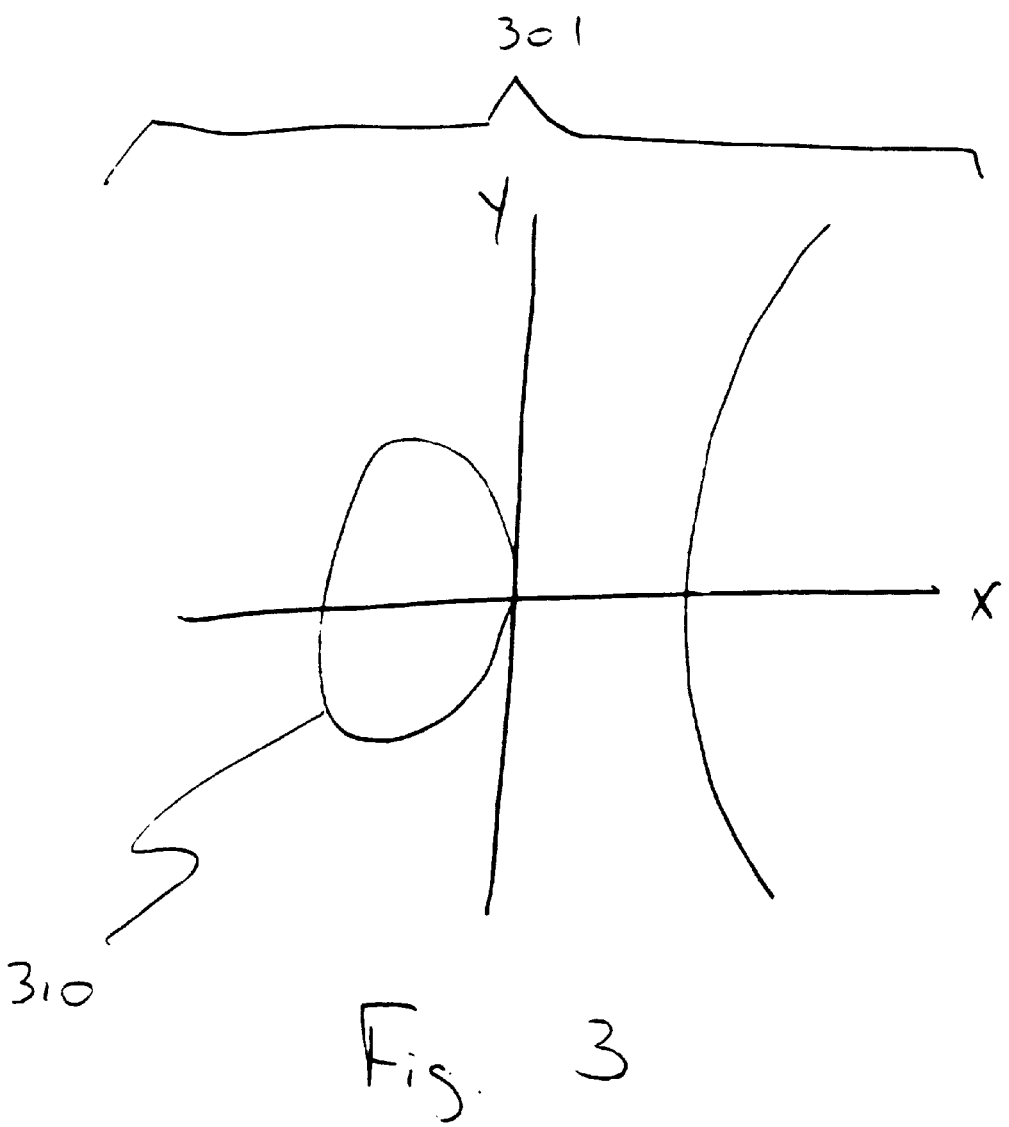
FIG. 3 depicts an example of an elliptic curve.

In an alternative embodiment, the elliptic shape is defined from the ridges of a fingerprint. Referring to FIG. 1, select a series of minutia points 130 from these digitized points at a diameter of for example five millimeters 120 from the center of rotation 110 of the fingerprint 101. Referring to FIG. 3, these minutia points form the ellipse 310 of the elliptic curve 301 for purposes of ECC.

Using an Iris as the Biometric

Figure 2:
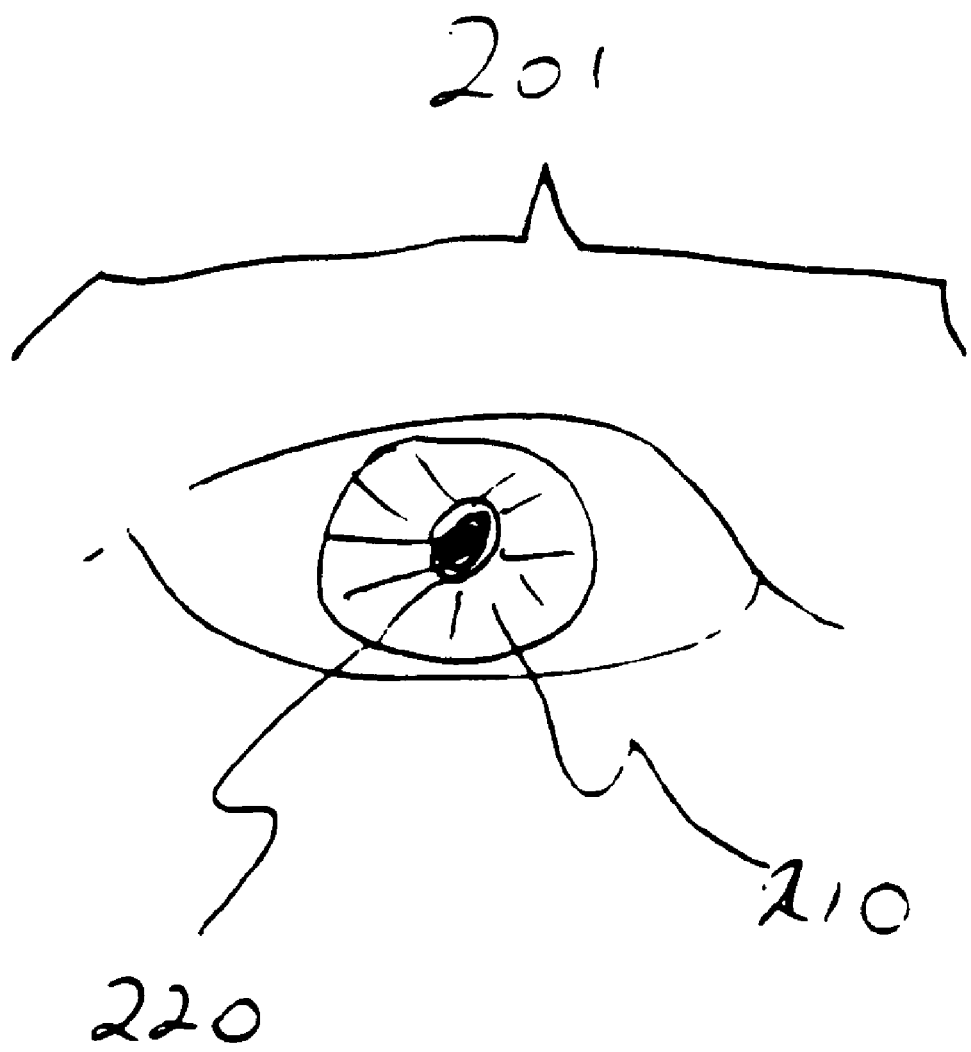
FIG. 2 depicts an eye.

Referring to FIG. 2, in an alternate embodiment, the iris 210 of the eye 201 is scanned and the color bands 220 of the iris are then processed. These digital points are then used to define the ellipse 310 for ECC purposes.

Alternative Embodiment: Smart Card Process

Figure 4:
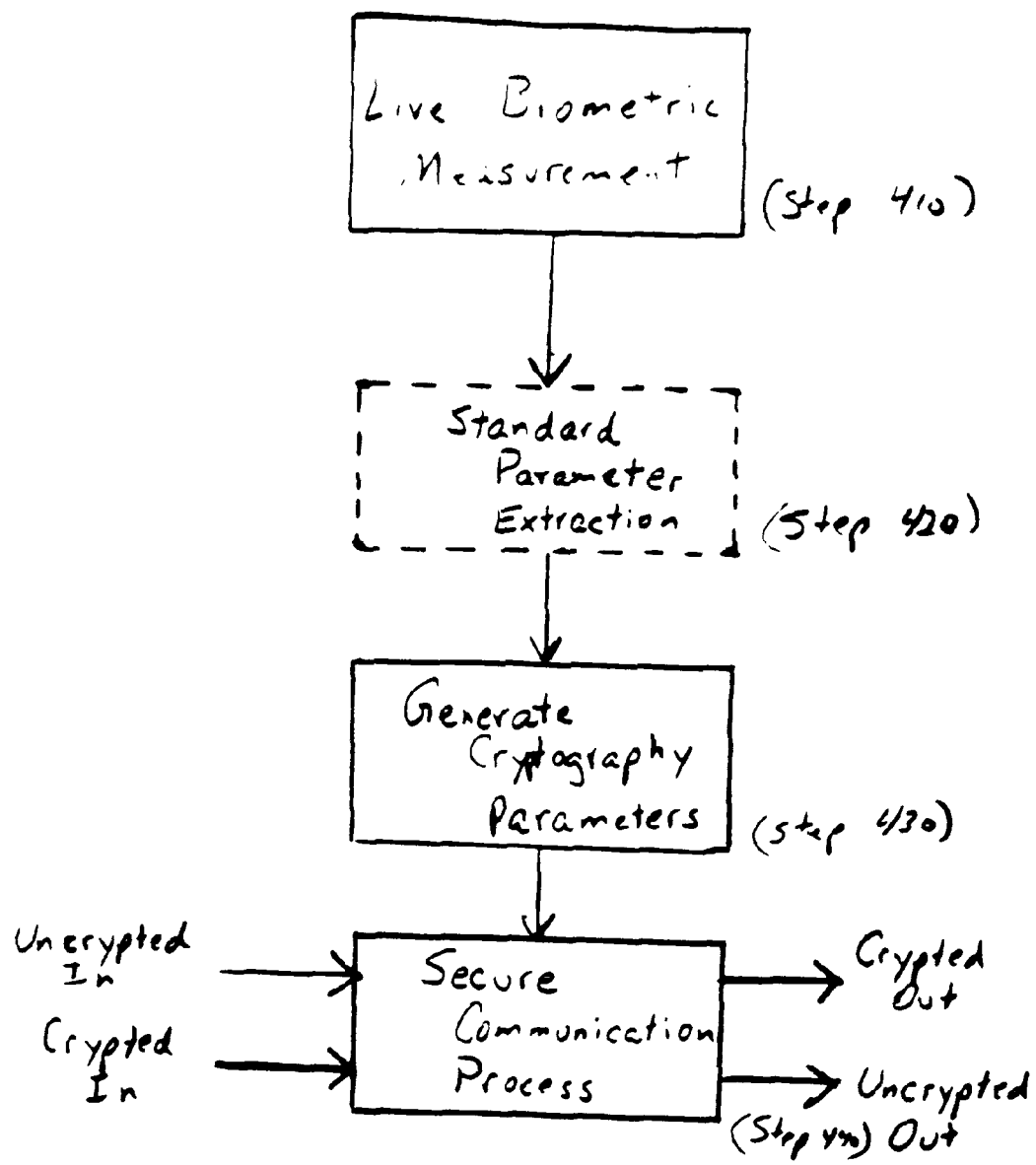
FIG. 4 depicts a flow chart for using smart card and biometric.
Figure 5:
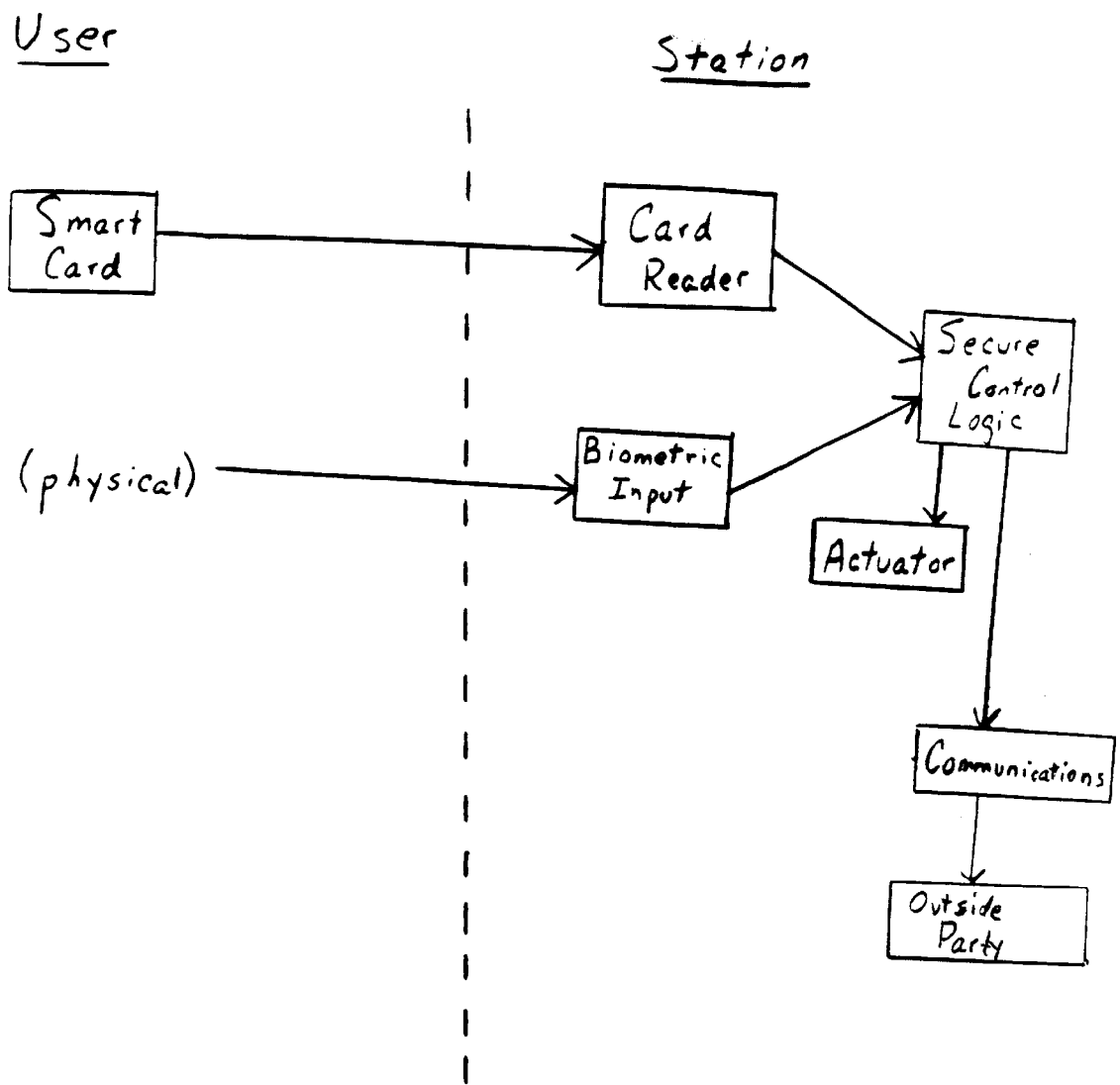
FIG. 5 depicts a block diagram for smart card and biometric process.

In an alternate embodiment, a smart card is inserted into a card reader for purposes of identification. The following process will be described with reference to FIG. 4. In conjunction with the smart card, a live biometric measurement step 410 such as a fingerprint is taken. The biometric is paramaterized using a standard parameter extraction step 420 and then used to generate cryptography parameters step 430. These cryptography parameters are the personal identification number (PIN) for the smart card and are not necessarily stored on the card. These cryptography parameters are then used in a secure communication process step 440 for encrypting or decrypting information. A block diagram of this process is illustrated in FIG. 5.

Alternative Embodiment: Secure Communication System

Figure 6:
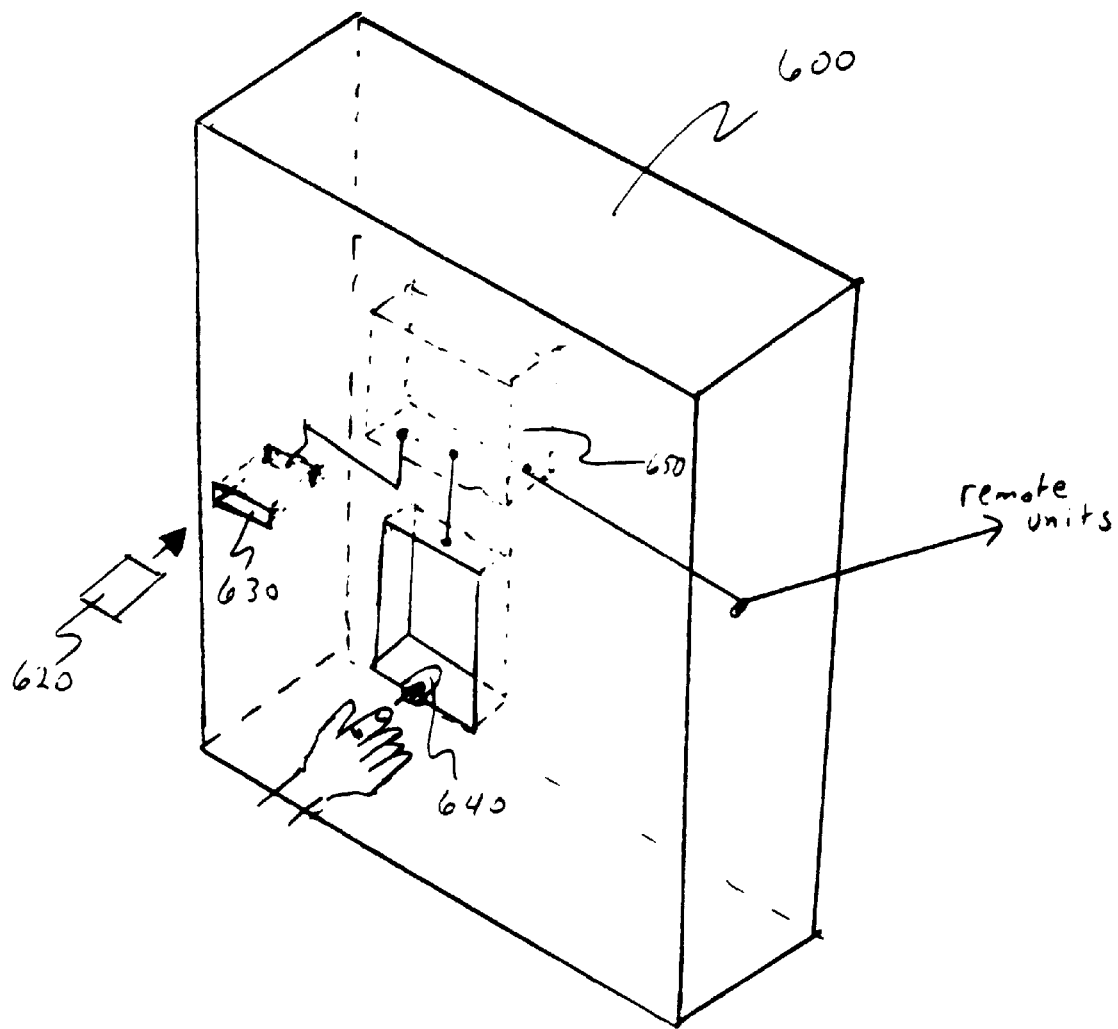
FIG. 6 depicts a system for secure communication.

FIG. 6 shows a sample smartcard-activated system unit 600. This can be, for example, an automatic teller machine (ATM). In this configuration, the system unit permits a user to insert an identification card 620, preferably a smart card which contains a microprocessor of some sort, into a card reader 630. A platen 640 mounted on the smartcard-activated system unit can detect the users finger print pattern. The processor 650, located inside the system unit, shown in phantom, performs the operations described above. Thus, the secure communication between the system processor 650 (and possibly also remote units that are accessed by the system processor) depends completely on correct initialization of encryption parameters by using the biometric data drive from the fingerprint detection.

Although described with reference to a smart card, other identification cards, such as a card with a magnetic stripe, could be used as well.

According to a disclosed class of innovative embodiments, there is provided: A method of defining the components for an encryption algorithm, comprising the steps of: measuring a biometric; and using the biometric to define mathematical parameters for an encryption algorithm.

According to another disclosed class of innovative embodiments, there is provided: A method of secure communication, comprising the steps of: reading a smart card; and measuring a biometric; using said biometric to define cryptographic parameters; using said cryptographic parameters for secure communication.

According to another disclosed class of innovative embodiments, there is provided: A method of defining the components for elliptic curve encryption, comprising the steps of: measuring a biometric; and using a naturally occurring shape from said biometric as the ellipse for elliptic curve cryptography.

According to another disclosed class of innovative embodiments, there is provided: A system for secure communication, comprising: at least one system processor; at least one biometric sensor; and at least one signal interface for interfacing to a portable data module; wherein said system processor is programmed to communicate with said portable data module using a secure communication algorithm which is dynamically defined, at least in part, by features obtained through said biometric sensor.

Advantages

The disclosed innovations provide at least the following advantages: the ellipse and/or the elliptic curve is guaranteed to be unique, the elliptic curve is less likely to be guessed because it is different for each user and therefore more secure, and the elliptic curve is generated much faster than with the current method of pure mathematical calculations.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

It should be noted that other biometrics other than a fingerprint or an iris may be used to define the ellipse or the curve preferably as long as the biometric has a naturally shaped curve. In alternative embodiments, it is contemplated that the biometric parameters can be used for input to other encryption algorithms. While elliptic curve cryptography is believed to be uniquely advantageous with biometrics the use of biometric data to define at least a portion of a key can be used in combination with a wide variety of other encryption algorithms including both public and secret key algorithms. One such encryption algorithm is Fast Elliptic Algorithm (FEAL) which is a secret key algorithm.

What is claimed is:

1. A method of defining the components for an encryption algorithm, comprising the steps of:

measuring a biometric; and using the biometric to define mathematical parameters for an encryption algorithm.

2. The method of claim 1, wherein said biometric is a fingerprint.

3. The method of claim 1, wherein said biometric is the iris of an eye.

4. The method of claim 1, wherein said biometric is a naturally occurring ellipse.

5. The method of claim 1, wherein said encryption algorithm is elliptic curve cryptography.

6. The method of claim 1, wherein said encryption algorithm is a public key cryptosystem.

7. The method of claim 1, wherein said encryption algorithm is a secret key cryptosystem.

8. The method of claim 1, wherein said encryption algorithm is fast elliptic algorithm.

9. A method of secure communication, comprising the steps of:

reading a smart card; and measuring a biometric;

using said biometric to define cryptographic parameters;

using said cryptographic parameters for secure communication.

10. The method of claim 9, wherein said biometric is a fingerprint.

11. The method of claim 9, wherein said biometric is the iris of an eye.

12. A method of defining the components for elliptic curve encryption, comprising the steps of:

measuring a biometric; and using a naturally occurring shape from said biometric as the ellipse for elliptic curve cryptography.

13. The method of claim 12, wherein said biometric is a fingerprint.

14. The method of claim 12, wherein said biometric is the iris of an eye.

15. A system for secure communication, comprising:

at least one system processor;

at least one biometric sensor; and at least one signal interface for interfacing to a portable data module;

wherein said system processor is programmed to communicate with said portable data module using a secure communication algorithm which is dynamically defined, at least in part, by features obtained through said biometric sensor.

16. The system of claim 15, wherein said portable data module is a smart card.

17. The system of claim 15, wherein said portable data module does not contain a sequenced processor at all.

18. The system of claim 15, wherein said biometric sensor is a fingerprint reader.

19. The system of claim 15, wherein said secure communication algorithm is elliptic curve cryptography.

* * * * *